(12) United States Patent
Harkin

(10) Patent No.: US 7,619,624 B2
(45) Date of Patent: *Nov. 17, 2009

(54) METHODS AND APPARATUS FOR RENDERING OR PREPARING DIGITAL OBJECTS OR PORTIONS THEREOF FOR SUBSEQUENT PROCESSING

(75) Inventor: Patrick A. Harkin, Beaverton, OR (US)

(73) Assignee: Micron Technology, Inc., Boise, ID (US)

( * ) Notice: Subject to any disclaimer, the term of this patent is extended or adjusted under 35 U.S.C. 154(b) by 379 days.

This patent is subject to a terminal disclaimer.

(21) Appl. No.: 11/210,402

(22) Filed: Aug. 24, 2005

(65) Prior Publication Data

US 2006/0017728 A1 Jan. 26, 2006

Related U.S. Application Data

(63) Continuation of application No. 09/888,890, filed on Jun. 25, 2001, now Pat. No. 6,937,236.

(51) Int. Cl.
*G06T 15/40* (2006.01)

(52) U.S. Cl. .............. 345/421; 345/422; 345/581; 345/606; 345/619

(58) Field of Classification Search .............. 345/606
See application file for complete search history.

(56) References Cited

U.S. PATENT DOCUMENTS

| | | | |
|---|---|---|---|
| 5,357,600 A | 10/1994 | Shirman et al. | |
| 5,407,082 A | 4/1995 | Childress et al. | |
| 5,651,106 A | 7/1997 | Ashburn | |
| 5,748,198 A | 5/1998 | Takeda et al. | |
| 5,757,321 A | 5/1998 | Billyard | |
| 5,898,437 A | 4/1999 | Deolaliker | |
| 5,914,721 A | 6/1999 | Lim | |
| 5,977,980 A | 11/1999 | Aleksicy | |
| 6,005,580 A | 12/1999 | Donovan | |
| 6,222,556 B1 | 4/2001 | Penna | |
| 6,304,265 B1 | 10/2001 | Harris et al. | |
| 6,437,780 B1 | 8/2002 | Baltaretu et al. | |
| 6,529,207 B1 | 3/2003 | Landau et al. | |

OTHER PUBLICATIONS

Blinn, James F. "Backface Culling Snags," Nov. 1993, IEEE Computer Graphics & Applications vol. 13, pp. 94-97.

*Primary Examiner*—Antonio A Caschera
(74) *Attorney, Agent, or Firm*—TraskBritt

(57) ABSTRACT

Methods and apparatus for rendering images of digital objects or for preparing digital objects for subsequent processing. The method includes sorting data representative of the positions of at least three vertices of at least one polygon of a digital object, then determining whether the orientation of the vertices of each polygon from a specific reference point differs from the actual, or original, orientation of the vertices. Such a determination may be made by generating an orientation decision variable based on the relative positions of the vertices and calculating a cross product term (CPT) after the vertex data has been sorted. The CPT may also be used in other operations involving the polygon, such as in imparting appearance characteristics to the polygon. The method may be embodied as a computer program (i.e., software or firmware) that controls the operation of a processor. Accordingly, processors, computers, and systems that render images of digital objects in accordance with the method are also disclosed.

29 Claims, 2 Drawing Sheets

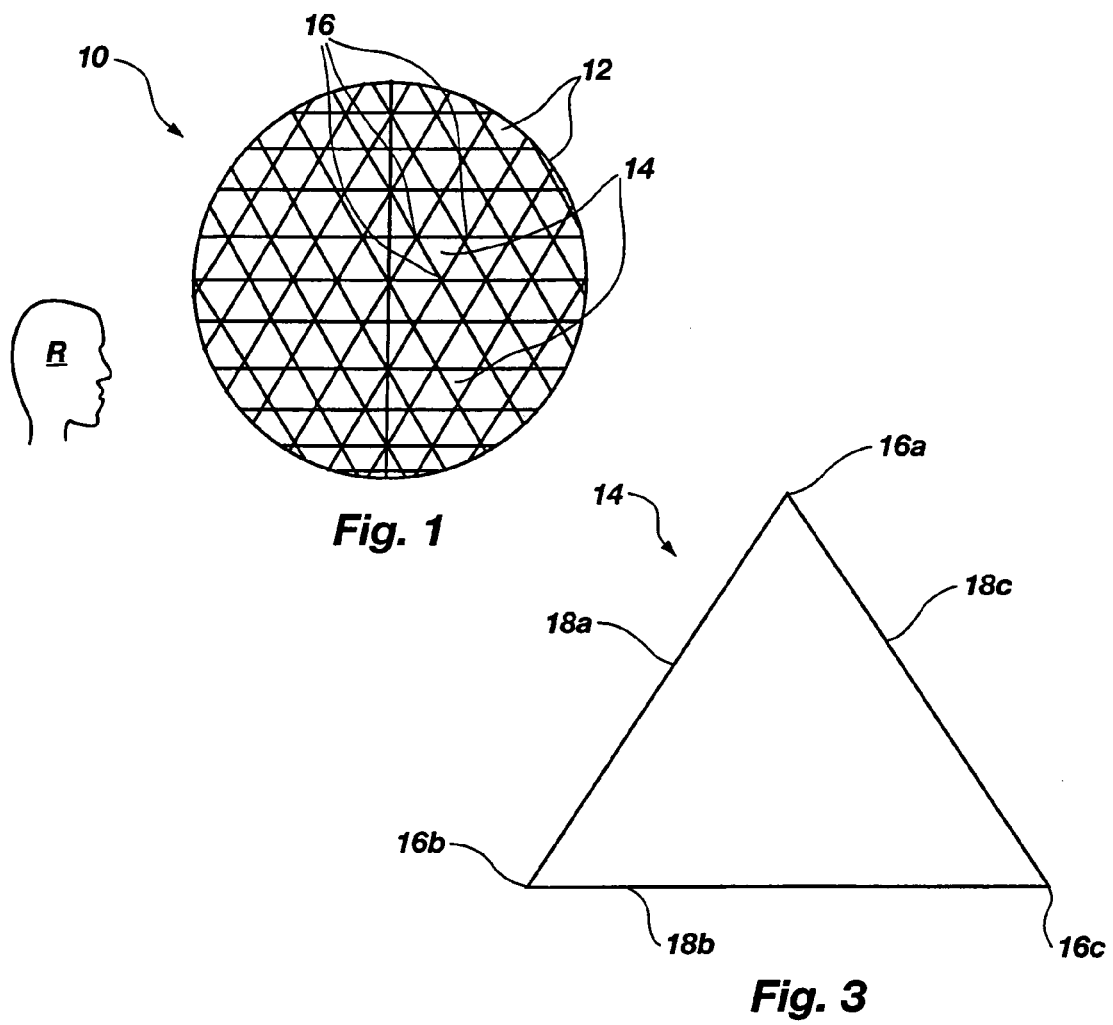
Fig. 1
Fig. 3
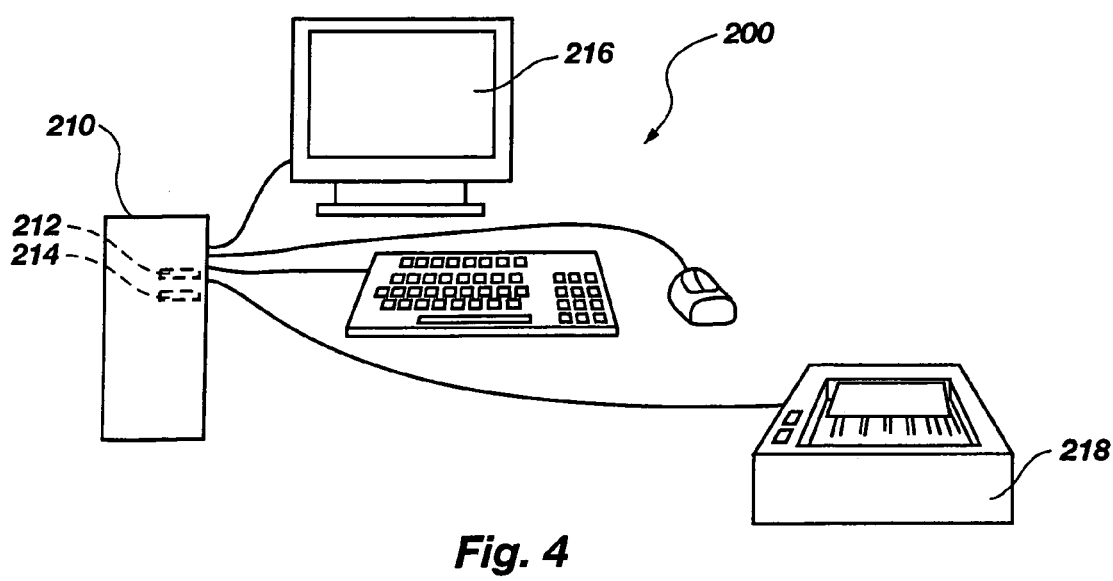
Fig. 4

METHODS AND APPARATUS FOR RENDERING OR PREPARING DIGITAL OBJECTS OR PORTIONS THEREOF FOR SUBSEQUENT PROCESSING

CROSS-REFERENCE TO RELATED APPLICATION

This application is a continuation of application Ser. No. 09/888,890, filed Jun. 25, 2001, now U.S. Pat. No. 6,937,236, issued Aug. 30, 2005.

BACKGROUND OF THE INVENTION

1. Field of the Invention

The present invention relates generally to methods and apparatus for rendering digital objects and, more specifically, to methods for identifying polygons that are back facing relative to a reference point and for culling the data of such back facing polygons prior to rendering. In particular, the methods and apparatus of the present invention decide whether to cull data for a particular polygon after the vertices of that polygon have been sorted to facilitate the accelerated processing of the polygons.

2. Background of the Related Art

As is well known in the art, computers typically break three-dimensional objects down into a series of polygons (e.g., triangles), which together make up the outer surfaces of the three-dimensional object. The relative positions of each of the polygons of a three-dimensional object are typically stored and manipulated in digital form, i.e., a series of 0's and 1's that indicates the locations of the polygons relative to one another on the three-dimensional object, as well as the positions, or locations (i.e., x-, y-, and z-coordinates), of the vertices of each polygon of the three-dimensional object. Accordingly, for purposes of this disclosure, the digital form of a three-dimensional object is referred to as a "digital object."

The data for each polygon of a digital object typically includes positional data for at least three vertices of the polygon along two adjacent edges. If the polygon is a triangle, the digital make-up of the triangle includes positional data for all three vertices of the triangle. Typically, the positional data for the vertices of each polygon of the digital object are arranged in the same orientation, or order. For example, the positional data for the vertices of all of the polygons of a digital object may be ordered around the peripheries of the polygons in a clockwise (CW) orientation or in a counterclockwise (CCW) orientation.

In addition to breaking a three-dimensional object down to data representative of the vertices of a collection of polygons having specific relative positions, characteristic data (e.g., color, shading, texture) for the entire three-dimensional object, for a portion thereof, or for each polygon or a small set of polygons may also be stored and processed in digital form.

When viewed from a specific reference point, such as from the viewpoint of a computer user looking at a video monitor or from one looking at an image on paper, a digital three-dimensional object is shown in two dimensions. Typically, only the portions of the digital object that face, or that are visible from, the reference point are shown. These portions of the digital object are the so-called "front facing" polygons of the digital object. This is true both when the digital object is in a stationary position and when the digital object is being moved or manipulated.

Polygons of a digital object that do not face the reference point are typically referred to as "back facing" polygons.

Relative to the reference point, the vertices of a back facing polygon have an orientation that is opposite the actual orientation of the vertices of that polygon. For example, if a polygon with CW-oriented vertices is back facing, the vertices will appear, from the reference point, to have a CCW orientation.

As back facing polygons of a digital object do not face a reference point, such as a viewer, back facing polygons are typically not displayed to the viewer. Accordingly, prior to rendering each synthesized, or rendered, image (i.e., each particular orientation or state), or scene, of the digital object, the other, nonvisible, back facing polygons of the digital object are typically culled, or eliminated from further processing until an image of the digital object has been rendered. By culling data for back facing polygons, rendering of an image of the digital object will be accelerated.

Prior to rendering an image of the digital object, the positional data for the vertices of a polygon are typically evaluated to determine whether, relative to the reference point of a viewer, the polygon is front facing or back facing.

Once the polygons of an image or scene of a digital object are transformed into the viewer's perspective (i.e., a two-dimensional image), the sign (S) of the z-axis term of the cross product, or cross product term (CPT), of two edges of each transformed polygon will indicate the orientation of vertices of the polygon (e.g., whether the transformed polygon has a CW or CCW orientation). For example, if the vertices of a polygon are oriented CW, the actual, or original, sign bit ($S_O$) is a "1." If the vertices of a polygon are oriented CCW, the actual, or original, sign bit ($S_O$) is a "0." This sign bit is then used to compare the (two-dimensional) position of each polygon in the image to be rendered to its actual, or original, orientation on the object (its two-dimensional orientation when front facing). If these orientations are not equal, the polygon is determined to be a back facing polygon and the data is culled from the rendering process.

An example of a conventional method for back face culling includes selecting the vertices, V0, V1, and V2, along two adjoined edges of each polygon. For purposes of this disclosure, V0, V1, and V2 refer to the order in which the positional data for the vertices of a polygon are introduced into a rendering application; these designations do not necessarily refer to the order in which vertices are located around the periphery of the polygon. The two-dimensional x-axis and y-axis positions of each of the vertices of a polygon of a digital object to be displayed or otherwise output are then determined, with $V0.x$, $V1.x$, and $V2.x$ being the respective x-axis positions of vertices V0, V1, and V2 and $V0.y$, $V1.y$, and $V2.y$ being the respective y-axis positions of vertices V0, V1, and V2. The differences between the x-axis and y-axis positions of each of the selected vertices are then determined, for example, as follows:

$$X10 = V1.x - V0.x;$$

$$Y12 = V1.y - V2.y;$$

$$X12 = V1.x - V2.x; \text{ and}$$

$$Y10 = V1.y - V0.y.$$

The CPT for the polygon is then calculated, as follows:

$$CPT = (X10 \times Y12) - (X12 \times Y10).$$

Assuming that the digital order in which the positional data for the analyzed vertices, V0, V1, and V2, are arranged remains unchanged from the order in which the positional data for these vertices was introduced into the rendering application, the sign (S) of the CPT (S=sign(CPT)) is then used to determine whether or not the data for the analyzed polygon should be culled prior to rendering. If the actual orientation of the vertices of the polygon was CW (i.e., $S_O=1$) and S=0, the analyzed polygon is back facing and, accordingly, the positional data for that polygon is culled. Alternatively, if the actual orientation of vertices of the polygon was CCW (i.e., $S_O=0$) and S=0, the positional data for the vertices of the polygon is retained for rendering purposes, as the polygon is front facing relative to the reference point and the polygon will be shown when the digital object is displayed or otherwise output.

In rendering a two-dimensional image of a three-dimensional digital object, it is often necessary to sort the vertices of each polygon. For example, the positional data for the vertices of a particular polygon of the digital object may be introduced into the rendering application in a particular order, which is then changed, such as in a triangle setup operation, to facilitate rendering of the polygon. Accordingly, the positional data for the various vertices of the polygon may be re-ordered, or shuffled, which will change a CPT that is based on the order in which the positional data for the vertices is presented. Thus, while conventional methods for culling back facing polygons decrease the amount of time necessary to render an image of a digital object, the vertex differences or CPT's calculated by these methods cannot be reliably reused for subsequent rendering operations, such as polygon characterization processes (e.g., determining the coloration, shadowing, or texturing of a polygon). As a consequence, the vertex differences or CPT's must be recalculated once sorting has occurred.

Moreover, if the positional data for the vertices of a particular polygon are sorted prior to determining the vertex differences or CPT's, without having the positional data for each vertex tied to an indicator of the position of the vertex on the polygon, the sign of a subsequently calculated CPT could provide incorrect information about whether the polygon is front facing or back facing.

No known prior art method or apparatus uses a CPT obtained by evaluating sorted vertices that can be used in analyzing polygons of a graphic image and determining whether to cull data representative of each analyzed polygon. Similarly, no known method or apparatus is used for calculating a CPT that may be used both in decisions to cull back facing polygons of a digital object and in subsequent rendering operations.

SUMMARY OF THE INVENTION

The present invention includes a method for using sorted vertices to make a decision on whether to cull back facing polygons. Apparatus and systems using the method to display one or more images of a digital object are also within the scope of the present invention.

The method of the present invention includes sorting the vertices of at least one polygon of a digital object, determining a CPT for the sorted vertices of the polygon, and determining whether or not the sign of the CPT should be reversed, or multiplied by −1.

Methods incorporating teachings of the present invention facilitate the use of sorted vertices in calculating the positional differences between the sorted vertices, as well as the use of sorted vertices in calculating a CPT for the sorted vertices. The sign of the CPT may then be used to determine whether the analyzed polygon is back facing and, if so, to indicate a decision to cull data representative of the polygon from the process of rendering an image of a digital object of which the back facing polygon is a part. In addition, the positional differences and CPT calculated in accordance with teachings of the present invention for each analyzed polygon may also be used in other operations relating to the processing or rendering of that polygon and of a digital image of which that polygon is a part.

The data for the vertices of each polygon of a digital object may be sorted by known processes, such as those employed in triangle setup procedures. Once the data is sorted, a CPT for the data may be determined, also using known processes.

Sorted and potentially rearranged vertices are used in accordance with the method of the present invention to determine the positional differences between the selected vertices of each analyzed polygon of a digital object, as well as the CPT of the selected vertices. Nonetheless, because the order of the selected vertices of each analyzed polygon may have been rearranged, the positional differences between adjacent ones of the selected vertices of each analyzed polygon and the CPT of each analyzed polygon may not indicate whether an analyzed polygon is a front facing or back facing polygon. Rather, the sign of the CPT may indicate that a front facing polygon is back facing or that a back facing polygon is front facing. The method of the present invention, therefore, includes a process wherein the order into which the data for the vertices of the polygon has been sorted is analyzed to determine whether or not the sign of the CPT should be changed, or inverted, prior to making a back face culling decision. An exemplary embodiment of this process includes computing a decision variable, T, to determine whether to change the sign of the CPT (e.g., from positive to negative or from 1 to 0, or from negative to positive or from 0 to 1).

Since the CPT and the values of the positional differences between the vertices of each analyzed polygon are based on sorted vertex data, these values may be used in other operations, such as coloring, shading, and texturing, that are conducted on each front facing polygon prior to rendering an image of a digital object.

Other features and advantages of the present invention will become apparent to those of ordinary skill in the art through consideration of the ensuing description, the accompanying drawings, and the appended claims.

BRIEF DESCRIPTION OF THE DRAWINGS

In the drawings, which illustrate exemplary embodiments of the present invention:

FIG. 1 is a schematic illustration of a three-dimensional digital object, including, from the reference point of a viewer's perspective, front facing polygons, shown in solid lines, and back facing polygons, which are not shown;

FIG. 3 schematically depicts a polygon of the digital object illustrated in FIG. 1; and FIG. 4 is a schematic representation of a system and apparatus that operate under control of a program incorporating methods of the present invention.

DETAILED DESCRIPTION OF THE INVENTION

Figure 2:
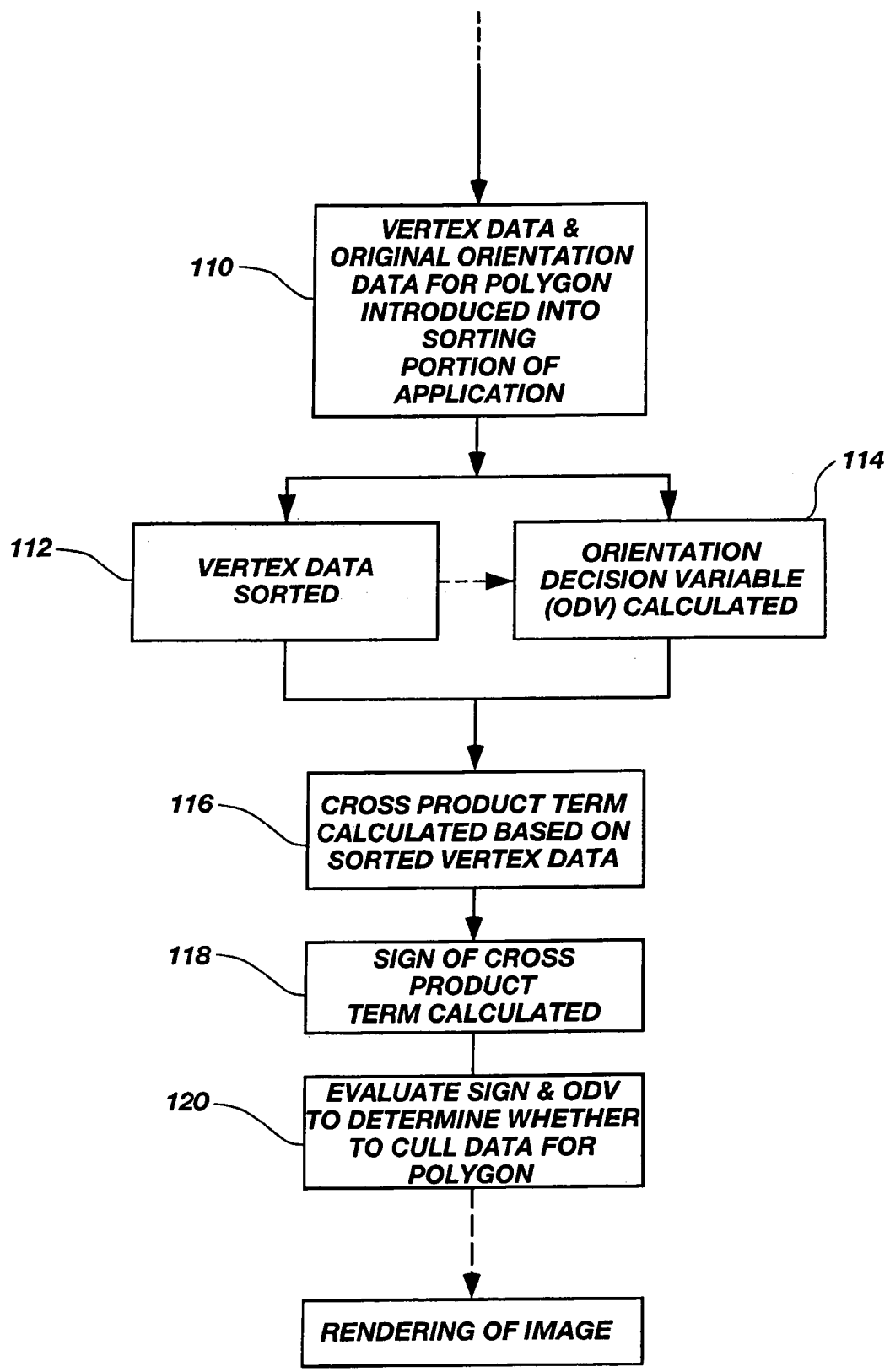
FIG. 2 is a flow diagram that illustrates the method of the present invention.

With reference to drawing FIG. 1, a three-dimensional digital object 10 is schematically illustrated. At least an outer surface 12 of digital object 10 is made up of a plurality of polygons 14, which are illustrated as being triangles having substantially identical dimensions. Each polygon 14 of digital object 10 includes at least three vertices 16, or corners. The numeric data stored for each polygon 14 of digital object 10 represents the positions of each vertex 16 of polygon 14 in the x-, y-, and z-axes. Data representative of the positions of the at least three vertices 16 of all of the polygons 14 that make up at least outer surface 12 of digital object 10 are used in various processes, including movement or manipulation of digital object 10, as well as in rendering an image of digital object 10.

A digital object 10 is rendered to display an image of digital object 10 to a viewer, such as on a computer monitor or on a printed page. Once the digital object 10 has been manipulated or moved relative to a reference point, such as the perspective of a viewer, the digital object 10 must be rerendered to indicate movement thereof to the viewer.

In rendering an image of a digital object 10, data regarding the orientation of digital object 10 and of the polygons 14 thereof is evaluated and data representative of the positions of the vertices 16 of each polygon 14 of digital object 10 is used to "build" an image of digital object 10 as it is to be shown to a viewer, such as on a computer monitor or on a printed page. The present invention includes methodology for effecting a portion of the rendering process, wherein the vertex 16 data for each polygon 14 of a digital image 10 is sorted, then the data for vertices 16 of polygons 14 that will not be visible from the reference point of a viewer (e.g., a computer user) will be culled, or omitted, from the rendering process, thus consuming less random access memory of a computer and speeding up the rendering process.

Illustrated in drawing FIG. 2 is a flow diagram illustrating the sorting and back face cull decision-making processes of the present invention.

Illustrated in drawing FIG. 3 is a graphic representation of an analyzed polygon 14 of a digital object 10 (see FIG. 1). As illustrated, polygon 14 is a triangle and includes three vertices 16a, 16b, and 16c.

With reference to both drawing FIGS. 2 and 3, prior to rendering an image of digital object 10, data for each vertex 16 of each polygon 14 of digital object 10 are sent to a portion of a processor under control of a sorting application, as shown at reference character 110 of FIG. 2. The order in which data for each of vertices 16a, 16b, 16c of polygon 14 are sent to the processor to be sorted may or may not be arbitrary. For example, the positional data for each of the vertices of a polygon may be organized in an order that facilitated a determination of new positions of each vertex following movement of the digital object. While the positional data for each of the three or more vertices of a polygon is "tied to," or associated with, that polygon, in order to conserve memory, the positional data may not be associated with an indicator for a position of a vertex on the polygon relative to other vertices of the polygon; rather, corresponding x-axis, y-axis, and z-axis data could be associated with a particular vertex based merely on the relative bit locations of these data.

Data representative of the actual CW or CCW orientation of vertices 16a, 16b, 16c of all of the polygons 14 of digital object 10 may also be sent to the processor, also at reference character 110 of drawing FIG. 2.

As the data for vertices 16a, 16b, 16c may be sent to the processor in an arbitrary order, the data representative of the positions of vertices 16a, 16b, 16c are then sorted, or organized or ordered, as indicated at reference character 112 of drawing FIG. 2, in a manner that facilitates further processing and use of data representative of the positions of vertices 16a, 16b, 16c and other values based thereon in rendering of an image of digital object 10.

For example, in triangle setup, the coordinates of vertices 16a, 16b, 16c are rasterized so the locations of the lines that define edges 18a, 18b, 18c of each polygon 14 of digital object 10 may be determined and front facing polygons 14 may be rendered. Rasterization could proceed in any order (e.g., horizontally from top to bottom or from bottom to top, or vertically from left to right or from right to left). Accordingly, the order of the vertices 16a, 16b, 16c is determined based on the order of rasterization. To compute the lines, or polygon edges 18a, 18b, 18c, between vertices 16a, 16b, 16c of polygon 14, the relative positions of vertices 16a, 16b, 16c must be determined and the order in which positional data representative of each vertex 16 is processed may be changed, depending on the order of rasterization. As an example of the manner in which vertices 16 may be organized, the following series of equations may be used:

| If ((V2.y == V0.y) AND (V2.x < V0.x)) | SORT[2] = 1 |
|---|---|
| Else if (V2.y < V0.y) | SORT[2] = 1 |
| Else | SORT[2] = 0 |
| If ((V1.y == V2.y) AND (V1.x < V2.x)) | SORT[1] = 1 |
| Else if (V1.y < V2.y) | SORT[1] = 1 |
| Else | SORT[1] = 0 |
| If ((V1.y == V0.y) AND (V1.x < V0.x)) | SORT[0] = 1 |
| Else if (V1.y < V0.y) | SORT[0] = 1 |
| Else | SORT[0] = 0 |

This series of equations arranges the positional data for vertices 16 of polygon 14 in order of their relative vertical positions. If two vertices 16 have the same vertical orientation, these two vertices 16 are then organized according to the relative horizontal positions.

As the CPT for a particular polygon 14 of a digital object 10 or the sign of the CPT may depend on the order in which the positional data for each of vertices 16a, 16b, 16c of polygon 14 is introduced into a processor, sorting of the vertex data may change one or both of the CPT and the sign thereof. As a consequence, a CPT that is calculated before positional data for vertices 16 of polygon 14 is sorted may not be useful in processes that follow a back face culling decision.

Once sorting has occurred, or concurrently with sorting the vertices 16 of an analyzed polygon 14 of a digital object, as depicted at reference character 114 of drawing FIG. 2, an orientation decision variable may be computed (e.g., by the processor) to provide information about whether or not the sign of a CPT for an analyzed polygon 14, which has yet to be calculated until after the positional data for vertices 16 of analyzed polygon 14 has been sorted, will accurately indicate the orientation of vertices 16 of analyzed polygon 14. If the orientation decision variable indicates that the sign of the CPT will not accurately indicate the orientation of vertices 16 of analyzed polygon 14, the orientation decision variable for polygon 14, which is to be subsequently used in a back face culling decision to denote that the apparent orientation of vertices 16 of analyzed polygon 14, as indicated by the sign of the CPT, is opposite the actual orientation of vertices 16 of polygon 14 when viewed from a particular reference point R. Accordingly, the orientation decision variable indicates that the actual orientation of vertices 16 of the polygon 14 is inverted from the apparent orientation of vertices 16, as indicated by the sign of the CPT.

As evidenced in the exemplary set of equations provided above, the orientation decision variable may be a three-bit variable that is determined substantially concurrently with sorting of the positional data for each vertes 16 of a polygon 14. By way of example, the following table illustrates, for each sort indication variable, the order in which vertices 16 of polygon 14 have been sorted (from sort step 2 to sort step 0, or [2:0]), relative to the presorting orientation, as well as the corresponding one bit orientation decision variable (T):

| SORT [2:0] | Relative Vertex Order | T |
|---|---|---|
| 000 | V0, V2, V1 | 1 |
| 001 | N/A | N/A |
| 010 | V0, V1, V2 | 0 |
| 011 | V1, V0, V2 | 1 |
| 100 | V2, V0, V1 | 0 |
| 101 | V2, V0, V1 | 1 |
| 110 | N/A | N/A |
| 111 | V1, V2, V0 | 0 |

Based on the sorted vertices, a CPT may be calculated (e.g., by the processor), as indicated at reference character 116 of drawing FIG. 2. The sign of the CPT, which is determined (e.g., by the processor), as known in the art, at reference character 118 of drawing FIG. 2, along with the orientation decision variable, may then be used in a back face culling decision (e.g., by the processor), as depicted at reference character 120 of drawing FIG. 2, to determine whether the orientation of an analyzed polygon 14 has changed from its actual orientation. For example, if vertices 16 on each polygon 14 of a digital object 10 are actually oriented CW, the sign of the CPT indicates a CCW orientation, and the decision variable (e.g., a "1") indicates that sorting has switched the sign of the CPT, the data for an analyzed polygon 14 will be used in rendering an image with that polygon 14 displayed. Alternatively, if, for a polygon 14 that is actually CW-oriented, the sign of the CPT indicates a CCW orientation and the decision variable (e.g., a "0") indicates that sorting has not altered the sign of the CPT, the sign of the CPT and the orientation decision variable together indicate that an analyzed polygon 14 is a back facing polygon and the data for polygon 14 is, therefore, culled.

A CPT that has been calculated following sorting of the data may also be used in processing that follows a sorting operation such as triangle setup but that must occur before the digital object is rendered. For example, but not to limit the scope of the present invention, a CPT that is calculated after sorting of the positional data for the vertices of a polygon may be used, as known in the art, to process various characteristic parameters of the polygon, such as the shadowing, color, or texture of the polygon, based on the position of the polygon on the digital object relative to a specific reference point R.

Accordingly, methods incorporating teachings of the present invention facilitate the faster processing of polygon data, as well as a reduction in the amount of memory required to process the polygon data.

As the method of the present invention is particularly useful when embodied as a set of instructions to control various decisions made by logic circuits of a computer processor, the present invention also includes apparatus and systems that process and display one or more images of digital object 10 or a portion thereof in accordance with teachings of the present invention. Illustrated in drawing FIG. 4 is an exemplary embodiment of such a system 200 and its component apparatus. For example, a system 200 incorporating teachings of the present invention may include a computer 210 with a processor 212 and memory 214 associated therewith, as well as hardware and programming configured to output one or more full or partial images of a digital object 10 to an apparatus that facilitates viewing of the image by a user, such as a monitor 216 or a printer 218.

Various logic circuits of processor 212 may be configured or programmed, such as by a back face culling application, to perform certain tasks in accordance with the inventive method. For example, a first logic circuit of processor 212 may sort data representative of at least three vertices 16 (FIGS. 1 and 3) of at least one polygon 14 (FIGS. 1 and 3) of digital object 10 (FIGS. 1 and 3), a second logic circuit of processor 212 may be configured to generate an orientation decision variable based on relative positions of vertices 16, and a third logic circuit of processor 212 may calculate a CPT of vertices 16 following sorting thereof by the first logic circuit. The first and second logic circuits of processor 212 may operate substantially concurrently, or at different times. When under control of a program that effects the method of the present invention, processor 212 may also include a fourth logic circuit that determines a sign of the CPT. Processor 212 may also include a fifth logic circuit that determines an orientation of one or more polygons 14 of digital object 10 based on the sign of the CPT and the orientation decision variable. The fifth logic circuit may also decide whether to cull data of vertices 16 based on the orientation of the corresponding polygon 14.

These logic circuits may comprise completely separate circuits of processor 212, or any combination of these logic circuits may be partially combined.

Although the foregoing description contains many specifics, these should not be construed as limiting the scope of the present invention, but merely as providing illustrations of some of the presently preferred embodiments. Similarly, other embodiments of the invention may be devised which do not depart from the spirit or scope of the present invention. Moreover, features from different embodiments of the invention may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

What is claimed is:

1. A method for preparing a digital object comprising:
  sorting data representative of at least three vertices of at least one polygon of at least a portion of
  the digital object based on relative positions of the at least three vertices along at least one axis;
  generating an orientation decision variable based on the relative positions of the at least three vertices;
  calculating a cross product term of the at least one polygon after sorting the data;
  evaluating a sign of the cross product term and the orientation decision variable; and
  rendering an image of at least a portion of the digital object on an apparatus for viewing the digital object.

2. The method of claim 1, wherein sorting comprises sorting data representative of the at least three vertices of the at least one polygon based on relative vertical positions of the at least three vertices.

3. The method of claim 1, wherein calculating includes determining positional differences between adjacent vertices of the at least one polygon after sorting the data.

4. The method of claim 1, further comprising:
  using at least one of the cross product term and a positional difference between two of the at least three vertices to determine an appearance characteristic of the at least one polygon.

5. The method of claim 1, wherein sorting and generating are effected concurrently.

6. The method of claim 1, wherein generating comprises generating the orientation decision variable based upon a sorted order of the data representative of the at least three vertices.

7. The method of claim 6, wherein generating further comprises generating the orientation decision variable to indicate that an orientation of the at least one polygon is one of an orientation of the at least one polygon, as indicated by a sign of the cross product term, and opposite an orientation of the at least one polygon, as indicated by the sign of the cross product term.

8. The method of claim 1, further comprising:
using at least one of the cross product term and values of the positional differences between the at least three vertices in at least one of a coloring process, a shading process, and a texturing process.

9. A method for preparing a digital object by performing at least one act of the method on a computing system, the method comprising:
storing data representative of at least three vertices of at least one polygon of at least a portion of the digital object on a memory of the computing system;
sorting the data representative of the at least three vertices based on relative positions of the at least three vertices along at least one axis;
generating an orientation decision variable based on the relative positions of the at least three vertices;
calculating a cross product term of the at least one polygon after sorting the data; and
determining a sign of the cross product term.

10. The method of claim 9, further comprising evaluating the sign of the cross product term and the orientation decision variable to determine an orientation of the at least one polygon.

11. The method of claim 10, further comprising:
evaluating an orientation of the cross product term and the sign of the cross product term.

12. The method of claim 11, further comprising:
changing the sign of the cross product term if the sign does not correspond to the orientation of the at least one polygon.

13. The method of claim 9, further comprising comparing the sign of the cross product term, as modified with the orientation decision variable, to determine an actual orientation of the at least one polygon.

14. The method of claim 13, further comprising using the actual orientation of the at least one polygon for determining whether the at least one polygon is front facing or back facing.

15. The method of claim 9, further comprising evaluating the sign of the cross product term and the orientation decision variable to determine whether to cull the data prior to rendering an image of at least a portion of the digital object.

16. An electronic system for processing a digital object, comprising:
means for sorting data representative of at least three vertices of at least one polygon of at least a portion of the digital object based on relative positions of the at least three vertices along at least one axis;
means for generating an orientation decision variable based on the relative positions of the at least three vertices;
means for calculating a cross product term of the at least one polygon after operation of the means for sorting;
means for determining a sign of the cross product term; and
means for evaluating the sign of the cross product term and the orientation decision variable.

17. The electronic system of claim 16, wherein the means for sorting comprises means for sorting data representative of the at least three vertices of the at least one polygon based on relative vertical positions of the at least three vertices.

18. The electronic system of claim 16, wherein the means for evaluating comprises means for determining an orientation of the at least one polygon.

19. The electronic system of claim 18, further comprising:
means for evaluating an orientation of the cross product term and the sign of the cross product term.

20. The electronic system of claim 19, further comprising:
means for changing the sign of the cross product term if the sign does not correspond to the orientation of the at least one polygon.

21. The electronic system of claim 16, wherein the means for evaluating comprises means for comparing the sign of the cross product term, as modified with the orientation decision variable, to determine an actual orientation of the at least one polygon.

22. The electronic system of claim 21, wherein the means for evaluating comprises means for determining whether the at least one polygon is front facing or back facing.

23. The electronic system of claim 16, wherein the means for evaluating the sign of the cross product term and the orientation decision variable comprises means for determining whether to cull the data prior to rendering an image of at least a portion of the digital object.

24. The electronic system of claim 16, further comprising:
means for determining an appearance characteristic of the at least one polygon by using at least one of the cross product term and a positional difference between two of the at least three vertices.

25. The electronic system of claim 16, wherein the means for sorting and the means for generating operate concurrently.

26. The electronic system of claim 16, wherein the means for generating comprises means for generating the orientation decision variable based upon a sorted order of the data representative of the at least three vertices.

27. The electronic system of claim 26, wherein the means for generating further comprises means for generating the orientation decision variable to indicate that an orientation of the at least one polygon is one of an orientation of the at least one polygon, as indicated by a sign of the cross product term, and opposite an orientation of the at least one polygon, as indicated by the sign of the cross product term.

28. The electronic system of claim 16, further comprising:
means for effecting at least one of a coloring process, a shading process, and a texturing process that employs at least one of the cross product term and values of the positional differences between the at least three vertices.

29. An electronic system for processing a digital object, comprising:
means for sorting data representative of at least three vertices of at least one polygon of at least a portion of the digital object based on relative positions of the at least three vertices along at least one axis;
means for generating an orientation decision variable based on the relative positions of the at least three vertices; and
means for calculating a cross product term of the at least one polygon and determining positional differences between adjacent vertices of the at least one polygon after operation of the means for sorting.

* * * * *

UNITED STATES PATENT AND TRADEMARK OFFICE
CERTIFICATE OF CORRECTION

PATENT NO. : 7,619,624 B2  Page 1 of 1
APPLICATION NO. : 11/210402
DATED : November 17, 2009
INVENTOR(S) : Patrick A. Harkin It is certified that error appears in the above-identified patent and that said Letters Patent is hereby corrected as shown below:

In column 8, lines 43-44, in Claim 1, delete "the digital object based on relative positions of the at least three vertices along at least one axis"; and insert the same on Col. 8, line 42 after "of" as a continuation of the same line.

In column 9, line 20, in Claim 9, delete "storing" and insert -- sorting --, therefor.

Signed and Sealed this

Nineteenth Day of January, 2010

David J. Kappos
*Director of the United States Patent and Trademark Office*